United States Patent [19]

Haiki et al.

[11] Patent Number: 5,373,912
[45] Date of Patent: Dec. 20, 1994

[54] CONTROL SYSTEM FOR RESTRICTIVELY CONTROLLING ELECTROMAGNETICALLY CONTROLLED DIFFERENTIAL

[75] Inventors: Takashi Haiki, Higashihiroshima; Yoshitaka Kimura, Hiroshima; Takeshi Sugimoto, Higashihiroshima; Minoru Takata, Hiroshima; Shigeaki Imaishi, Hiroshima; Yoshihisa Shikenya, Hiroshima; Tadashi Kimura, Higashihiroshima, all of Japan

[73] Assignee: Mazda Motor Corporation, Hiroshima, Japan

[21] Appl. No.: 27,486

[22] Filed: Feb. 8, 1993

[30] Foreign Application Priority Data

Feb. 6, 1992 [JP] Japan .................................. 4-021159

[51] Int. Cl.⁵ .............................................. B60K 17/35
[52] U.S. Cl. .................................. 180/249; 180/248; 475/150; 477/35
[58] Field of Search ............... 180/247, 248, 249, 250; 192/0.096, 48.2; 74/856

[56] References Cited

U.S. PATENT DOCUMENTS

| | | | |
|---|---|---|---|
| 4,552,241 | 11/1985 | Suzuki | 180/249 |
| 4,566,554 | 1/1986 | Suzuki | 180/249 |
| 4,582,160 | 4/1986 | Weismann et al. | 180/250 |
| 4,624,349 | 11/1986 | Watanabe | 192/0.096 X |
| 4,718,303 | 1/1988 | Fogelberg | 180/249 X |
| 4,776,421 | 10/1988 | Kashihara | 180/249 X |
| 4,781,078 | 11/1988 | Blessing et al. | 192/48.2 X |
| 4,937,750 | 6/1990 | Gilliam | 180/248 X |
| 4,989,686 | 2/1991 | Miller et al. | 180/248 X |
| 5,044,458 | 9/1991 | Schwarz et al. | 180/247 X |
| 5,119,900 | 6/1992 | Watanabe et al. | 180/249 X |

FOREIGN PATENT DOCUMENTS 63-192620  8/1988  Japan .

Primary Examiner—Richard M. Camby
Assistant Examiner—F. Zeender
Attorney, Agent, or Firm—Keck, Mahin & Cate

[57] ABSTRACT

A differential control system for restrictively controlling a differential, which has electromagnetically controlled clutches disposed between differentially driven shafts, is electromagnetically controlled to lock and unlock the driven shafts. The control system has a controller for restrictively applying a locking current to the differential to lock and unlock the clutches in accordance with control modes manually selected.

13 Claims, 5 Drawing Sheets

CONTROL SYSTEM FOR RESTRICTIVELY CONTROLLING ELECTROMAGNETICALLY CONTROLLED DIFFERENTIAL

BACKGROUND OF THE INVENTION

1. Field of the Invention

The present invention concerns a control system for restrictively controlling an electromagnetically controlled differential.

2. Description of Related Art

Differentials drive both axles at same time but allow them to turn at different speeds when negotiating turns. Such a differential is typically comprised of differential pinions and cylindrical racks which are meshed with the differential pinions so as to hold them. Alteratively, a sun gear and planetary gears are often used as a differential. In order to restrict differential action of these differentials, mechanical clutches are internally provided. Hydraulically controlled types of mechanical clutches have conventionally been used. However, because of easy control, a recent tendency is to use what is called "electromagnetically controlled differentials" (which are hereafter referred to as EMC differentials) in which electromagnetically controlled clutches are installed in order to restrictively control differential action.

Reference is made to FIG. 8 for the purpose of providing a brief background of a general EMC differential, described in, for instance, Japanese Unexamined Patent Publication No. 63-192620, which will enhance an understanding of operation of the restrictive control system for the differential action of the present invention. An EMC differential, which is generally indicated by a numeral 1, is basically comprised of a planetary gear mechanism including a differential case 11, a planetary carrier 12 and a sun gear 13. The differential case 11 connects the engine output transmitted from a drive shaft (not shown) to the EMC differential 1. The drive shaft is an engine crankshaft if the EMC differential is a center differential; a front propeller shaft if it is a front differential; and a rear propeller shaft if it is a rear differential. The planetary carrier 12 connects the rotation of the drive shaft transmitted from the differential case 11 to a first driven shaft (not shown), which driven shaft is the front propeller shaft if the EMC differential is the center differential; one of the front axles if it is the front differential; and one of the rear axles if it is the rear differential. The sun gear 13 connects the rotation of the drive shaft transmitted from the differential case 1 to a second driven shaft (not shown), which driven shaft is the rear propeller shaft if the EMC differential is the center differential; another front axle if it is the front differential; and another rear axle if it is the rear differential.

The EMC differential 1 has two multiple disc clutches, such as a pilot clutch 14a and a main clutch 14b, each of which is actuated and deactuated by means of electric magnet 15. When the electric magnet 15 is energized, the planetary carrier 12 and the sun gear 13 are locked up together to restrict a differential action between the first and second driven shafts. While the electric magnet 15 is deenergized, the planetary carrier 12 and the sun gear 13 are free in operation from each other to allow a differential action between the first and second driven shafts. On the other hand, when the electromagnet 15 is energized, it attracts a metal disk 17, depressing clutch disks of the pilot clutch 14a so as to lock the pilot clutch 14a. The attraction of the metal disk 17 forces the differential case 11 to move axially toward the right as viewed in FIG. 8, so that the main clutch 14b is locked by the differential case 11 as well. As a result, the planetary carrier 12 and the sun gear 13 are mechanically coupled together with the differential case 11 through a pressure ring 16 and, accordingly, turn together so as to restrict a differential action between the first and second driven shafts, thereby creating the locked state of the differential 1.

Typically, four wheel drive vehicles are provided with EMC differentials of this type such as front, center and rear EMC differentials $1f$, $1c$ and $1r$, as schematically shown in FIG. 7. The center EMC differential $1c$ allows a differential action between front and rear wheels W1 and W2. The front and rear EMC differentials $1f$ and $1r$ allow differential actions between the front wheels W1 (W11 and W12) and between the rear wheels W2 (W21 and W22), respectively.

In the operation of such a four wheel drive vehicle provided with three EMC differentials, as described in the above mentioned publication, the transmission of torque to the front and rear axles is controlled by a function of transmissive torque of the clutch in such a manner that a bias or torque difference is provided between front and rear output shafts of a center differential.

However, in the conventional EMC differential control, if the engine stops while the EMC differentials are restricted in differential action or locked, each of the EMC differentials is cut off from the supply of current simultaneously with the stop of the engine, so that an abrupt unlocking of the EMC differential occurs. This abrupt unlocking allows the output shaft to have residual torque. Accordingly, at the time the EMC differential becomes free from restriction, i.e. unlocked, it generates shock, accompanied by an extraordinary clicking sound, due to which the vehicle vibrates.

SUMMARY OF THE INVENTION

It is an object of the present invention to provide a control system for restrictively controlling electromagnetically controlled differential means of a vehicle which prevents the vehicle from causing lateral runout and vibration.

The foregoing object is accomplished by providing a control system for restrictively controlling differential means of a vehicle, which differential means has electromagnetically controlled clutches disposed between differential driven shafts and is electromagnetically controlled to lock and unlock the driven shafts. The differential control system includes a control mode selection means which is manually operated to select control modes in which the differential means are restrictively locked and unlocked in predetermined different patterns. The control system has a control means for restrictively applying a locking current to the differential means so as to cause it to lock and unlock the clutches in accordance with a selected control mode. Specifically, the control means supplies and controls the locking current to the electromagnetically controlled clutches so as to gradually lower the locking current to zero and shut it off from the electromagnetically controlled clutches for unlocking the driven shafts when a specific driving condition is detected. Gradually lowering of the locking current causes the electromagnetically controlled clutches to be gradually unlocked, so that releasing of the residual torque of each of the driven shafts is not made rapidly but gradually, thereby avoiding the generation of extraordinary inhospitable noise.

When the driven shaft is subjected to a torque higher than a specified torque, the locking current is continuously maintained until it is lowered to zero even in the event that electrical loads, such as head lamps, an air conditioning system, etc., are re-activated. Accordingly, in spite of the activation of the electrical loads, the driven shaft is released from a cyclic torque, so as to decrease a load to which the electromagnetically controlled clutches are subjected.

When gradual lowering of the locking current is caused while the electrical loads are activated, a rate at which the locking current is lowered is increased so as to suppress the consumption of electric power, thereby avoiding a full discharge of a battery. Further, when there occurs an engine stall, the locking current is immediately shut off from the electromagnetically controlled clutches. This allows the battery to be subjected to a lower electric load when the engine is re-started. Since, even if the ignition switch is turned off after an engine stall, supplying of the gradually lowering locking current is continuously held, and no extraordinary noise is generated.

In the case of four wheel drive vehicles, the differential means comprises more than one differential, such as a center differential whose electromagnetically controlled clutch is connected between front and rear propeller shafts as driven shafts, a front differential whose electromagnetically controlled clutch is connected between front axles as driven shafts, and a rear differential whose electromagnetically controlled clutch is connected between rear axles as driven shafts. The center, front and rear differentials are unlocked one after another with time delays in a specific order, such as an order of magnitude of a "cyclic torque" which refers to a torsional force between the related driven shafts due to the difference in their rotational speeds.

BRIEF DESCRIPTION OF THE DRAWINGS

The above and other objects and features of the present invention will be clearly understood from the following detailed description with respect to preferred embodiments thereof when considered in conjunction with the accompanying drawings, in which.

DETAILED DESCRIPTION OF THE PREFERRED EMBODIMENT

Because various types of differentials are well known, the present description will be directed in particular to elements forming part of, or cooperating directly with, an apparatus in accordance with the present invention. It is to be understood that parts or elements which are purely of conventional constructions will not be described in detail and that parts or elements not specifically shown or described can take various forms well known to those skilled in the automobile art.

Figure 1:
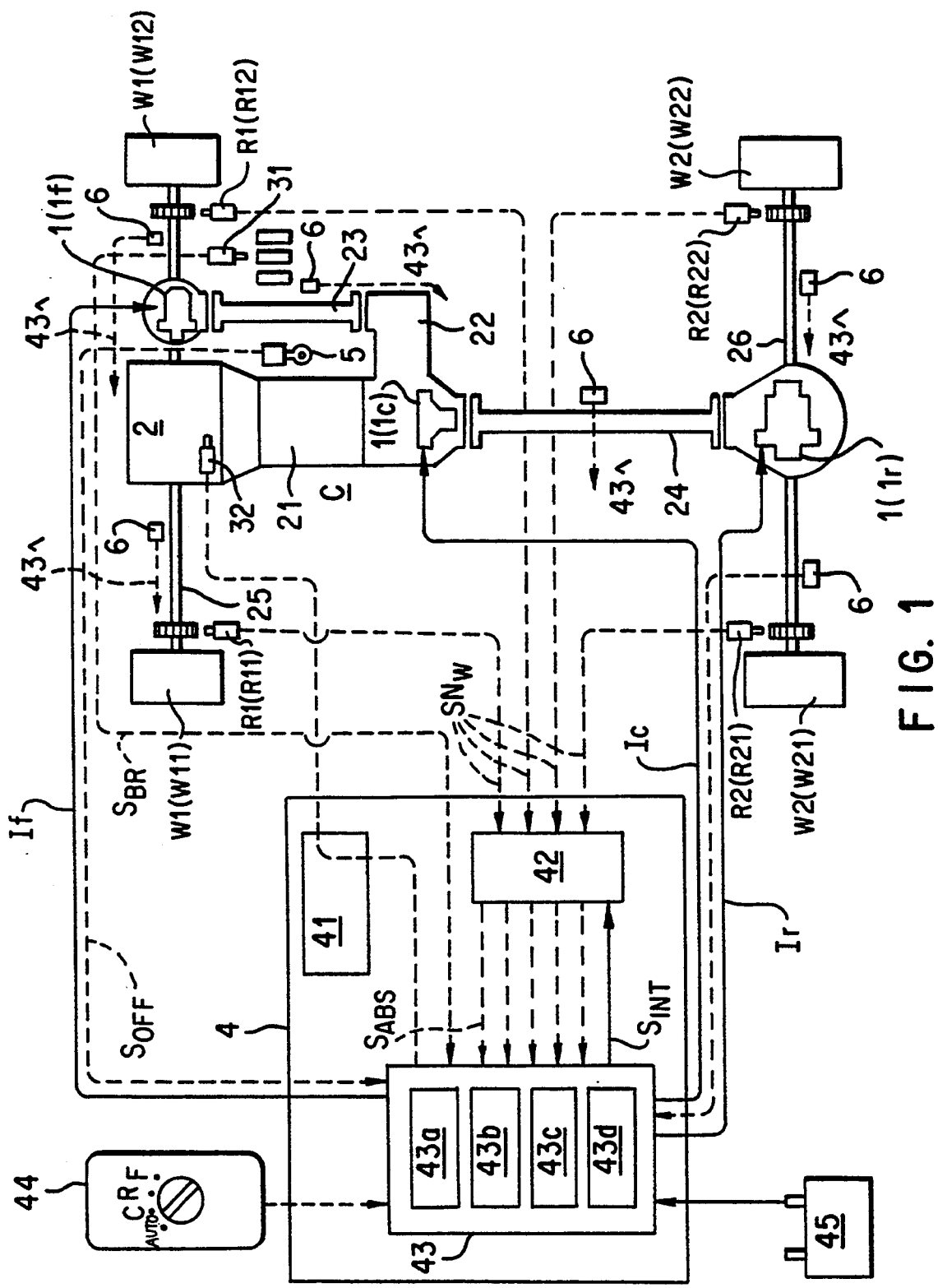
FIG. 1 is a schematic illustration showing a differential control system in accordance with a preferred embodiment of the present invention.
Figure 8:
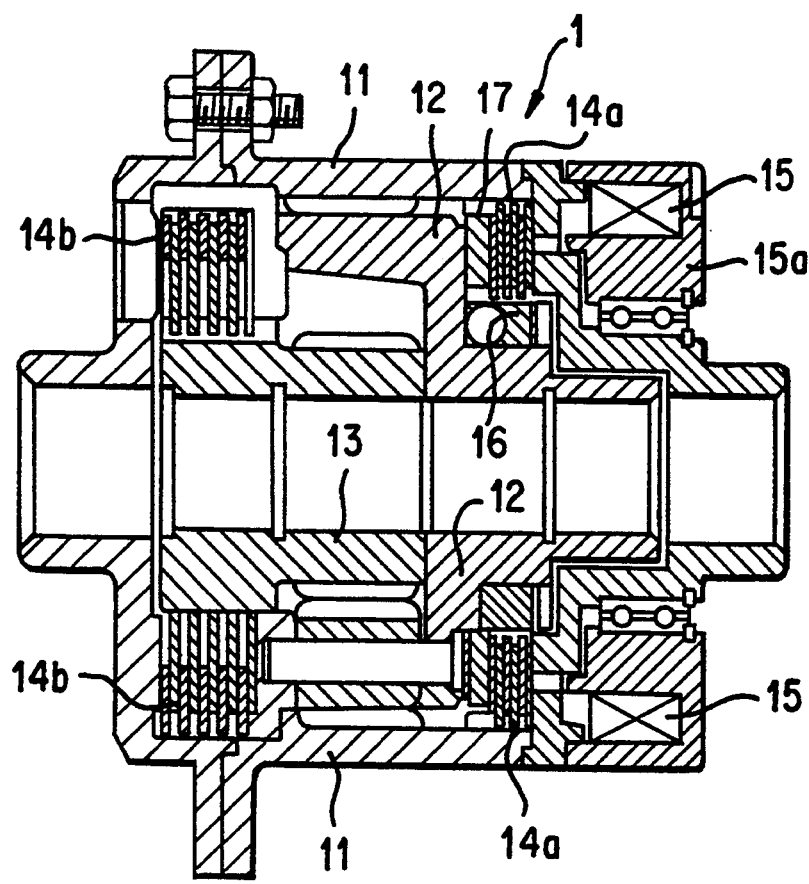
FIG. 8 is a schematic cross-sectional illustration showing, by way of example, an electromagnetically controlled differential.

Referring to the drawings in detail, and, in particular, to FIG. 1, a power train of a four wheel drive vehicle including an EMC differential means 1, which is restrictively controlled by a differential control system in accordance with a preferred embodiment of the present invention, is schematically shown the power train includes an engine 2, a transmission 21 connected to the engine 2 and a transfer case 22 connected to the transmission 21. The transfer case 22 includes a center EMC differential $1c$ which, in turn, provides driving force to both front and rear propeller shafts 23 and 24 as its driven shafts. A front EMC differential $1f$ is provided between the front propeller shaft 23 and the front axles 25 to drive the front axles 25 as its driven shafts so as to allow the front wheels W1 (W11 and W12) to turn at different speeds when rounding even a slight corner. Similarly, a rear EMC differential $1r$ is provided between the rear propeller shaft 24 and the rear axles 26 to drive the rear axles 26 as its driven shafts so as to allow the rear wheels W2 (W21 and W22) to turn at different speeds when rounding a corner. The EMC differentials $1c$, $1f$ and $1r$ themselves are the same in structure and operation as the EMC differential previously described and shown in FIG. 8.

In association with the front and rear wheels W11 and W12, and W21 and W22, there are provided wheel speed sensors R11 and R12, and R21 and R22, respectively. In addition to the rotational speed sensors R11, R12, R21 and R22, there are provided a switch and a sensor in association with a brake pedal (not shown) and the engine 2, respectively. Specifically, a brake switch 31, which detects whether or not the brake pedal is depressed, is provided. A throttle opening sensor 32 is provided in the engine 2 to detect opening of an engine throttle (not shown). Further, there is provided a mode selection switch 44, which is manually operated by the driver, for selecting restrictive modes of differential action.

The operation of the power train is governed by means of a control unit 4 which, in turn, includes an engine controller 41, an anti-skid brake system controller (which is hereafter referred to as an ABS controller) 42 for controlling an anti-skid brake system (not shown but well known in the art), and a differential action controller 43, each of which will be described later. This control unit 4 is actuated by a battery 45.

The engine controller 41 receives a throttle opening signal (TVS), representative of an opening of the engine throttle, which, in turn, is further transmitted to the differential action controller 43. The ABS controller 42 receives wheel speed signals ($N_w$), representative of wheel rotational speeds, from the wheel speed sensors R11 and R12, and R21 and R22, respectively, which, in turn, are further transmitted to the differential action controller 43. The ABS controller 42 further provides the differential action controller 43 with an ABS signal ($S_{ABS}$), representative of actuation of the anti-skid brake system. The differential action controller 43 receives a signal, representative of a selected restrictive mode of differential action, from the mode selection switch 44 along with a brake signal ($B_{BR}$), representative of the depression of the brake pedal, from the brake switch 31. According to these signals, the differential action controller 43 provides a specific level of control current to the electromagnets 15 (see FIG. 8) of each of the EMC differentials 1c, 1f and 1r so as to activate it. According to specific levels of control current, each EMC differential 1c, 1f, 1r is selectively changed in operation to an unlocked state, a semi-locked state (in which slippage is allowed between the driven shafts) and a locked state (in which no slippage is allowed between the driven shafts). Further, if necessary, the differential action controller 43 provides the ABS controller 42 with an interruption signal ($S_{INT}$) of the anti-skid brake system.

Figure 2:
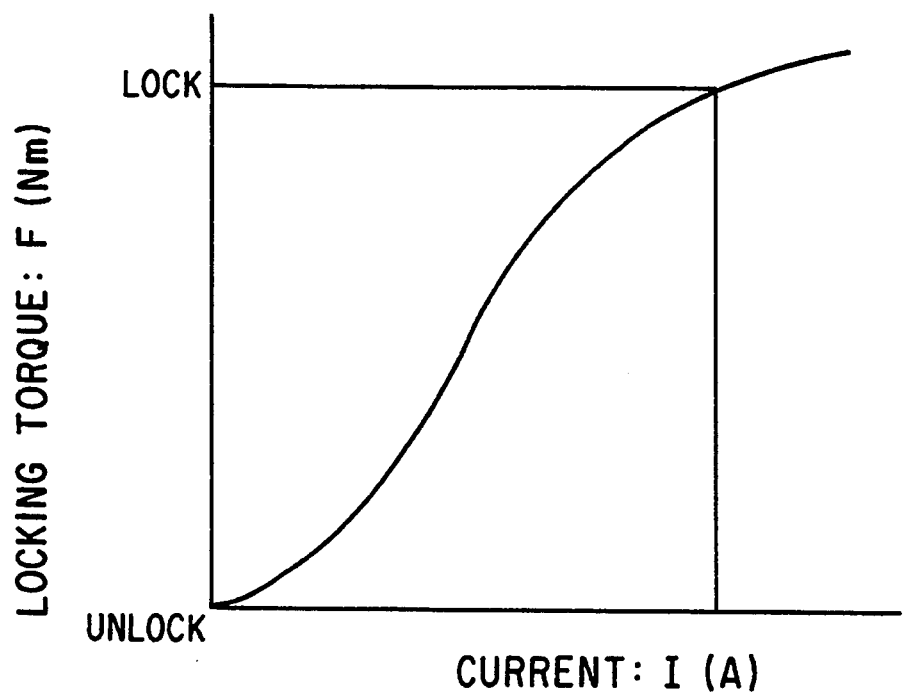
FIG. 2 is a diagram showing the relation between locking current and locking torque.

Referring to FIG. 2, a graph is shown illustrating the relation of the locking torque F, between the drive shaft and both first and second driven shafts, relative to the magnitude of control current I supplied to the electromagnet 15 of the EMC differential. In this instance, as for the center EMC differential 1c, an engine crankshaft is taken for the drive shaft, and the front and the rear propeller shafts 23 and 24 are, respectively, taken for the first and second driven shafts. On the other hand, as for the front EMC differential 1f, the front propeller shaft 23 is taken for the drive shaft, and the front axles 25 are, respectively, taken for the first and second driven shafts. Similarly, as for the rear EMC differential 1r, the rear propeller shaft 24 is taken for the drive shaft, and the rear axles 26 are, respectively, taken for the first and second driven shafts. Since, as is apparent from the graph shown in FIG. 2, the locking torque F is proportional to the magnitude of control current I, the differential action of the first and second driven shafts can be easily controlled by controlling the magnitude of control current of the electromagnet 15 of the EMC differential.

The mode selection switch 44 is available to select various restrictive modes of differential action shown in the following Table I.

TABLE I

| Control Mode | Differential | Control |
|---|---|---|
| A Mode | Front | Unlocked (If = 0) |
|  | Center | Auto Control |
|  | Rear | Auto Control |
| C Mode | Front | Unlock (If = 0) |
|  | Center | Locked (Ic = 2.2A) |
|  | Rear | Auto Control |
| R Mode | Front | Unlocked (If = 0) |
|  | Center | Locked (Ic = 2.2A) |
|  | Rear | Locked (Ir = 4.1A) |
| F Mode | Front | Locked (If = 2.1A) |
|  | Center | Locked (Ic = 2.2A) |
|  | Rear | Locked (Ir = 4.1A) |

In the above table, If, Ic and Ir in the parentheses denote control current necessary to lock the electromagnets 15 of the respective EMC differentials If, Ic and If, respectively. The magnitude difference in control current is due to the difference in characteristics of the electromagnets 15 of the respective EMC differentials If, Ic and If. If the "A Mode" is selected, while the front EMC differential if is unlocked, both center and rear EMC differentials 1c and 1r are automatically controlled. In the "C Mode," the center EMC differential 1c is locked, but the front EMC differential 1f is unlocked, and the rear EMC differential 1r is automatically controlled. However, in the "R Mode," the front EMC differential 1f is unlocked, and both center and rear EMC differentials 1c and 1r are locked. If the "F Mode" is selected, all the EMC differentials, 1f, 1c and 1r, are locked.

The A mode, in which the front EMC differential 1f is unlocked, has less effect on both drivability and driving performance of the vehicle and is advantageous for driving on ordinary roads in towns. On the other hand, although the F mode, in which the EMC differentials 1f, 1c and 1r are locked all at once, adversely affects the drivability of the vehicle, it is favorable to the driving performance of the vehicle and, accordingly, is advantageous for driving on rough roads and off-road driving.

In the auto control, which is conducted in the A mode and the C mode, rotational speeds of the respective wheels W11, W12, W21 and W22 are separately monitored by the wheel speed sensors R11 and R12, and R21 and R22, respectively. The ABS controller 42 determines the highest wheel speed among the four wheels as a vehicle speed $V_{sp}$ and calculates differential speeds dNc and dNr of the center and rear EMC differentials 1c and 1r or a differential speed dNr of the rear EMC differential 1r from the following formulas:

$$dNc = [(N_{w11} + N_{w12}) - (N_{w21} + N_{w22})]/2$$

$$dNr = (N_{w21} - N_{w22})$$

The differential speed dNc indicates the difference in rotational speed between the front and rear propeller shafts 23 and 24, and differential speed dNr indicates the difference in rotational speed between the left and right wheels W21 and W22. If the differential speeds dNc and dNr are beyond predetermined critical speeds, respectively, it is assumed that the road on which the vehicle is traveling is rough, so that the vehicle is unstable in driving and easily slips. When the ABS controller 42 detects differential speeds dNc and dNr beyond the critical speeds, then, it provides proper magnitudes of control current Ic and If in accordance with the detected differential speeds dNc and dNr to the electric magnets 15 of the center and rear EMC differentials 1c and 1r, respectively, or a current Ir in accordance with the differential speed dNr to the electric magnet 15 of the rear EMC differential 1r, so as to change the state of semi-locking the center and rear EMC differentials 1c and 1r or the rear EMC differential 1r.

The restrictive actions of the EMC differentials depending upon the applications of the brake and the ABS are shown in the following Table II:

| Control Mode | Brake ABS | Diff. | Control |
|---|---|---|---|
| A Mode | Brake | Front | Unlocked (If = 0) |
|  | On | Center | Unlocked (Ic = 0) |
|  |  | Rear | Unlocked (Ir = 0) |
| C Mode | Brake | Front | Unlocked (If = 0) |
|  | On | Center | Semi-Locked (Ic = 0.2A; within 0.2 sec) |
|  |  | Rear | Unlocked (Ir = 0) |
|  | ABS | Front | Unlocked (If = 0) |
|  | On | Center | Unlocked (Ic = 0; within 0.2 secs) |
|  |  | Rear | Unlocked (Ir = 0) |
| R Mode | Brake | Front | Unlocked (If = 0) |
|  | On | Center | Semi-Locked (Ic = 0.8A) |
|  |  | Rear | Semi-Locked (Ir = 1.2A) |

-continued

| Control Mode | Brake ABS | Diff. | | Control |
|---|---|---|---|---|
| | ABS On | Fron Center Rear | Unlocked (If = 0) Unlocked (Ic = 0) Unlocked (Ir = 0) | |
| F Mode | No ABS control is applied | | | |

As is well known, the anti-skid brake system monitors the speeds of the respective wheels and the speed of the vehicle to detect skids of the respective wheels and controls braking force to the respective wheels so as to cancel restrictive differential actions between wheels. However, in vehicles equipped with front, center and rear differentials, locking any one of these differentials disables estimates of the speed of a vehicle, so that the anti-skid brake system can hardly control skid of the wheels. For this reason, the differential control system of the present invention is designed and is adapted to perform the controls shown in Table II in the respective modes while the anti-skid brake system is activated. Specifically, when the brake is applied in the A mode, the ABS controller 42 provides control currents If, Ic and Ir at a level of zero (0) to the electromagnetic clutches 14a and 14b of the front, center and rear EMC differentials 1f, 1c and 1r, respectively, so as to unlock all of the front, center and rear EMC differentials 1f, 1c and 1r. On the other hand, in the F mode, the anti-skid brake system is not applied. However, the C mode and the R mode are interim in restrictive control between the A mode and the F mode.

In the restrictive differential control, the restriction of the EMC differentials is removed without causing lateral shaking and/or vibration of the vehicle.

Figure 3:
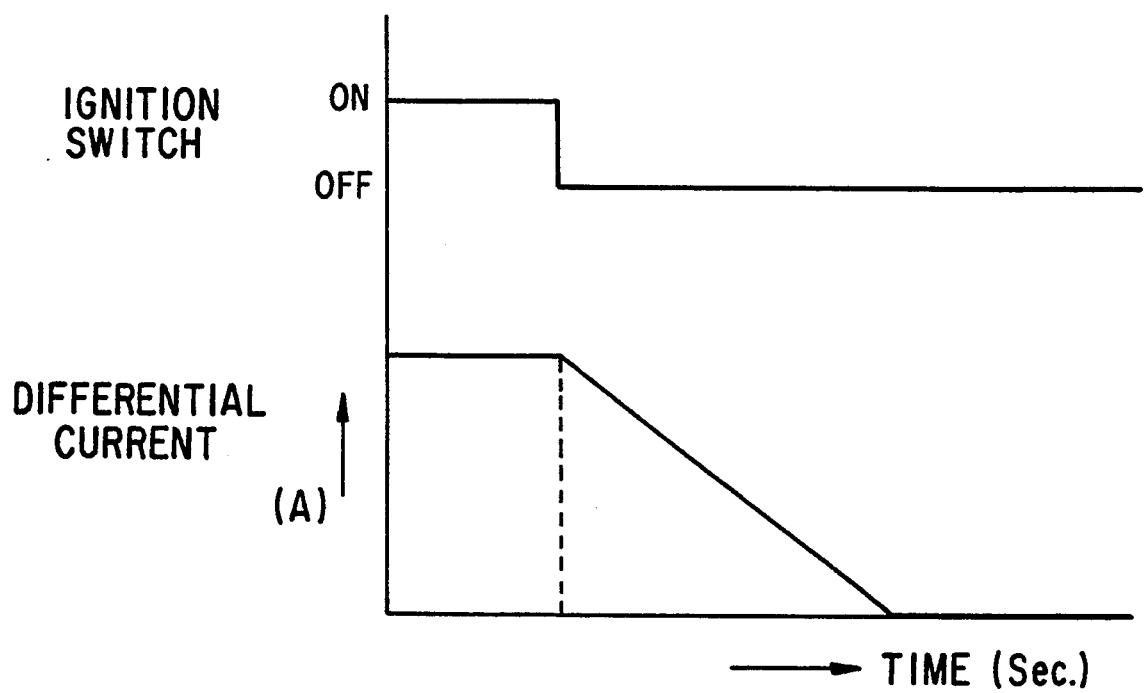
FIG. 3 is a diagram showing a change of locking current when an ignition switch is turned off.

Referring back to FIG. 1, the differential action controller 43 of the control unit 4 has an internal primary current controller 43a for decreasingly changing the magnitude of control current to the electromagnetic clutches 14a and 14b of each of the front, center and rear EMC differentials 1f, 1c and 1r finally to the level of zero so as to shut off the control current, thereby unlocking the EMC differential. Specifically, as shown in FIG. 3, when an ignition switch 5 is turned off, the primary current controller 43a commences a gradual drop in control current I of the electromagnetic clutch means of the EMC differential within a specific time. This is significantly different from the conventional current control in which the current is instantaneously shut off when an ignition switch is turned off, as shown by a chained line in FIG. 3. The primary current controller 43a, Which is formed as an electric circuit comprised of electric resistances, condensers, a solenoid, etc., may take any well known form or be of any known type.

The control current to each of the EMC differentials 1f, 1c and 1r is shut off generally only when the ignition switch 5 is turned off to shut off all electric systems of the vehicle and when the mode selection switch 44 selects another restrictive mode. When charging restrictive modes from one to another, for instance, changing from the F mode, in which all EMC differentials are locked, to the R mode, in which only the front EMC differential 1f is unlocked and the center and rear EMC differentials 1c and 1r remains locked, the primary current controller 43a shuts off the front EMC differential 1f but holds currents to the center and rear EMC differentials 1c and 1r. Which EMC differential or differentials should be shut off is or are recognized by the control unit 4 in accordance with the Table II. When the ignition switch 5 is turned off, the control unit 4 receives an off-ignition signal ($S_{OFF}$) from it and causes the primary current controller 43a to gradually lower the control current of the subjected EMC differential to zero level. Similarly, when the mode selection switch 44 selects another restrictive mode, the control unit 4 receives a mode signal from it and causes the primary current controller 43a to gradually lower the control current of the subjected EMC differential and finally shut it off.

If more than one EMC differential must become unlocked, the primary current controller 43a shuts them off with time delays in order of magnitude of what is called a "cyclic torque" which refers to a torsional force between the related driven shafts due to the difference of their rotational speeds. Specifically, the primary current controller 43a commences first to shut off that one whose driven shafts are subjected to the smallest cyclic torque and last that one whose driven shafts are subjected to the largest cyclic torque. Practically, although the front, center and rear EMC differentials 1f, 1c and 1r are usually shut off in this order, they may be shut off in order of magnitude of the cyclic torque from small to large.

After lowering the control current to any EMC differential to turn off of the ignition switch 5, if the ignition switch 5 is turned on again so as to activate the electric systems of the vehicle, ordinarily, before the control current disappears, the primary current controller 43a re-supplies a control current to each of the EMC differentials 1f, 1c and 1r to lock it in accordance with a selected restrictive mode. However, if the respective driven shafts, including the front and rear propeller shafts 23 and 24, and the front and rear axles 25 and 26, are subjected to large cyclic torques, in order to release the cyclic torque, the differential action controller 43 has an internal supplemental current controller 43b by which a gradual lowering of control current supplied to the electromagnetic clutches 14a and 14b of each of the EMC differentials 1f, 1c and 1r is continuously caused until it lowers completely to the level of zero. For this purpose, torque sensors 6 are provided to monitor cyclic torques of the respective driven shafts and send signals representative of the monitored cyclic torques to the supplemental current controller 43b of the differential action controller 43. If the signal indicates a cyclic torque larger than a specified fundamental value, the supply of control current is switched from the primary current controller 43a to the supplemental current controller 43b. The supply of control current, gradually lowering to a zero level, by the supplemental current controller 43b continuously takes place for a specified period of time established by an internal timer (not shown) of the supplemental current controller 43b. After the specified time period of control current supply by the supplemental current controller 43b, the supply of control current, gradually lowering, takes place again through the primary current controller 43a. By such an alternative supply of control current, the cyclic torque is released completely from the driven shaft.

The differential action controller 43 further has an internal overload preventive current controller 43c which is similar in function to the primary current controller 43a but gradually lowers the control current to the electromagnetic clutches 14a and 14b of each of the front, center and rear EMC differentials 1f, 1c and 1r to the level of zero at a rate higher than that of the primary current controller 43a. This is to prevent what is called a "complete discharge" of the battery 45 caused by an abrupt consumption of electric power. Such an abrupt consumption of electric power can possibly happen if electrical loads, such as head lamps, an air conditioning system, etc., are activated coincidentally with the supply of control current by the primary current controller 43a. That is, if there is a requirement for the EMC differentials 1f, 1c and 1r to be unlocked while the electrical load or loads are activated, the overload controller 43c receives signals indicative of the activations of the electrical loads and response thereto the supply of control current is switched from by the primary current controller 43a to the overload controller 43c.

The differential action controller 43 further has an internal current shut-off controller 43d for immediately shutting off a control current to the electromagnetic clutches 14a and 14b of any one of the front, center and rear EMC differentials 1f, 1c and 1r in response to an engine stall, thereby uncoupling the EMC differential. Whenever an engine stall occurs, in order to re-start the engine 2, it is general to turn on the ignition switch 5 to cause a self-starting motor (not shown). Such a self-starting motor (which is activated by a self-starter, not shown) consumes a large electric power. Apparently, such a re-starting of the engine 2 made during supplying of control current to the electromagnetic clutches 14a and 14b of any one of the front, center and rear EMC differentials 1f, 1c and 1r is one of the positive causes of a complete discharge of the battery 45. Once the current shut-off controller 43d is activated, the engine 2 is operated by the aid of the self-starting motor for pulling the vehicle in an emergency lane or a road shoulder without a complete discharge of the battery 45. If the ignition switch 5 is turned off simultaneously with the occurrence of an engine stall, the current shut-off controller 43d causes the primary current controller 43a to supply a control current to the electromagnetic clutches 14a and 14b of each of the EMC differentials 1f, 1c and 1r. Accordingly, extraordinary noise due to an immediate disappearance of the supply of control current is avoided excepting when the self-starting motor is driven for emergency pulling in of the vehicle.

Figure 4:
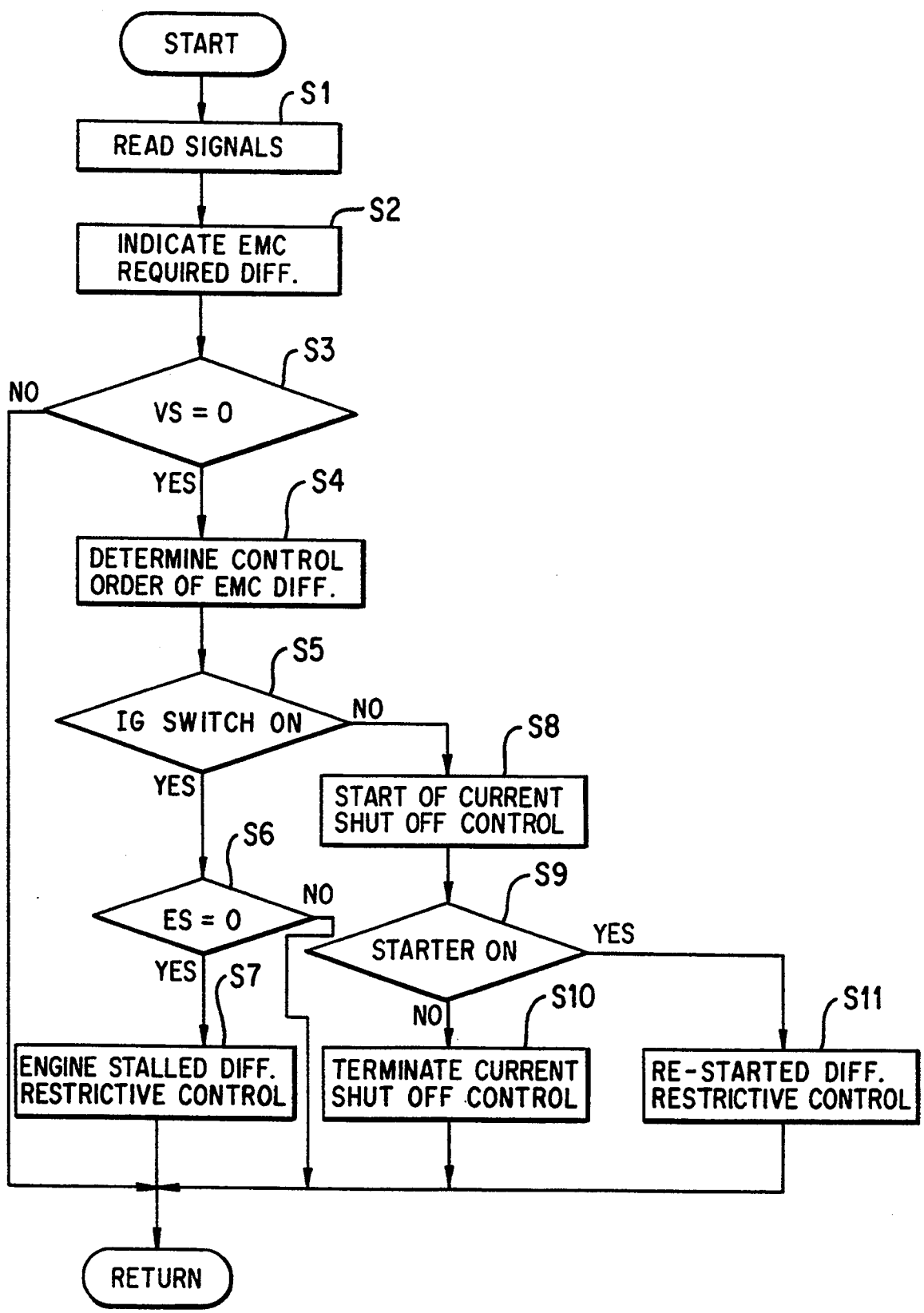
FIG. 4 is a flow chart of a current shut off control main routine.
Figure 5:
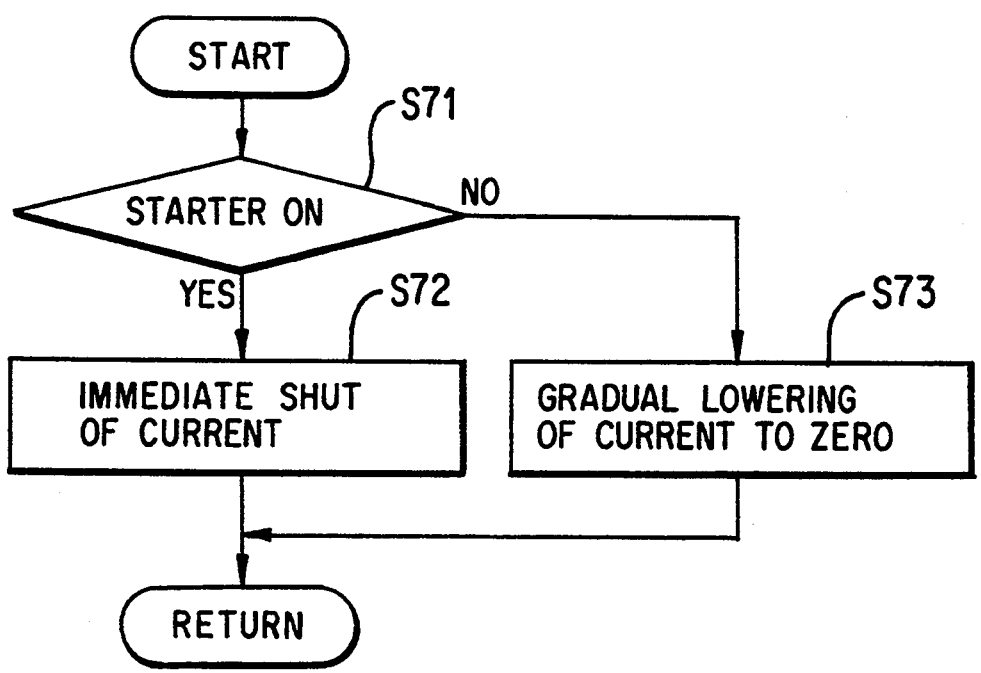
FIG. 5 is a flow chart of an engine stalled differential restrictive control subroutine.
Figure 6:
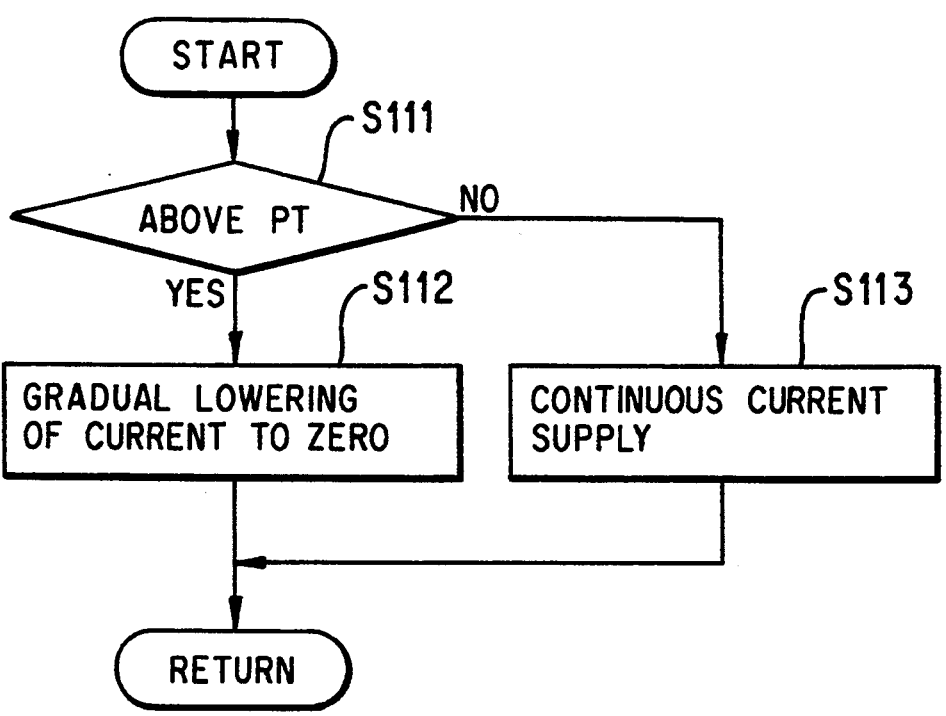
FIG. 6 is a flow chart of an engine re-started differential restrictive control subroutine.
Figure 7:
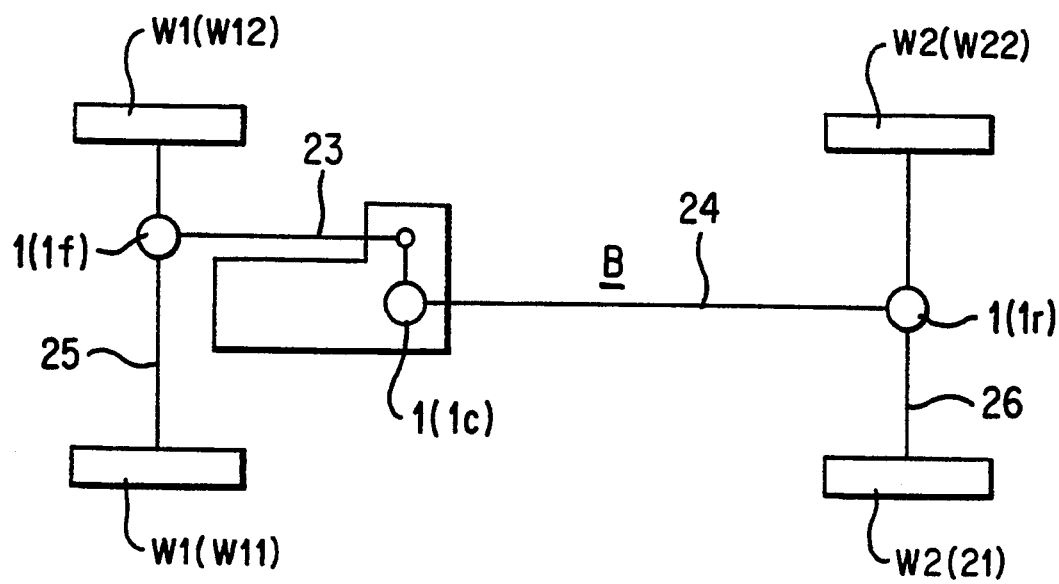
FIG. 7 is a schematic illustration showing a differential control system in accordance with a preferred embodiment of the present invention which is installed in a four wheel drive vehicle.

The operation of the differential control system depicted in FIG. 1 will be best understood with reference to FIGS. 4 to 6, which are flow charts illustrating a main routine and subroutines for the microcomputer of the control unit 4. Programming a computer is a skill well understood in the art. The following description is written to enable a programmer having ordinary skill in the art to prepare an appropriate program for the microcomputer of the control unit 4. The particular details of any such program would of course depend upon the architecture of the particular computer selected.

Referring to FIG. 4, which is a flow chart of the differential restrictive control main routine for the micro computer of the control unit 4, the first step at step S1 is to read various control parameters, such as wheel speeds, cyclic torques, a selected restrictive mode, in the form of electric signals. According to the selected restrictive mode, any one or more than one of the EMC differentials 1f, 1c and 1r, which must be unlocked by being shut down, are designated at step S2. Then, a decision is made at step S3 whether or not the vehicle speed (VS), which is calculated from the wheel speeds, is zero, in other words, the vehicle is running. If the answer to the decision made at step S3 is "NO," this indicates that the vehicle is running, and then, the step orders return so as to avoid the differential restrictive control. However, if the vehicle is not running, the answer is "YES," then and, the order of shutting down control current to the EMC differentials is determined based on the cyclic torques from the torque sensors 6 related to the respective driven shafts, namely, the front and rear propeller shafts 23 and 24, and the front and rear axles 25 and 26, at step S4. Thereafter, a decision is made at step S5 whether or not the ignition switch 5 is turned on. If the answer is "NO," this indicates that the ignition switch 5 has been turned off, then, the current control means 43a starts to lower the control currents supplied to the related EMC differentials with specified time delays in order from the smallest magnitude of the cyclic torque to the largest magnitude of the cyclic torque at step S8. Ordinarily, the current controllers 43a lower the control currents to the level of zero and shut them off from the related EMC differentials at step S10. However, during the lowering of control current, as a result of a decision made at step S9 as to whether or not the engine is re-started, if the answer is "YES," i.e. if re-starting of the engine 2 is detected at step S9, the engine re-started restrictive differential control subroutine, which will be described later, takes place at step S11.

On the other hand, if the answer to the decision concerning the operation of the ignition switch 5 made at step S5 is "YES," then, a decision is made at step S6 as to the speed of the engine 2. If the answer is "NO," this indicates that the engine 2 is idling, and then, the main routine is repeated without shutting off of any control current to the related EMC differential. However, if the answer is "YES," this indicates an engine stall because the engine 2 stops despite the ignition switch 5 having been turned on. If actually an engine stall is detected at step S6, then, the engine-stalled differential restrictive control (engine-stalled DRC) subroutine, which will be described later, takes place at step S7.

Referring to FIG. 5, which is a flow chart illustrating the engine-stalled restrictive differential control subroutine, the first step at step S71 is to make a decision as to whether or not the self-starter has been turned on. This decision is made in order to prevent an excessive consumption of electric power of the battery 45 that is caused by re-starting the engine 2 through the operation of the starter immediately after an engine stall and by activating the self-starting motor for an emergency pulling in of the vehicle. If the answer to the decision is "YES," then, the current shut-off controller 43d is activated at step S72 and immediately shuts off a control current so as to uncouple any related EMC differential. On the other hand, if the answer to the decision is "NO," this indicates that the driver has no intention of re-starting the engine 2, and then, the primary current controller 43a is held activated until it gradually lowers the control current to the level of zero at step S73.

Referring to FIG. 6, which is a flow chart illustrating the re-started differential restrictive control subroutine, the first step at step S111 is to make a decision as to whether or not a cyclic torque of the driven shaft is larger than the specified fundamental value. If the answer to the decision is "YES," then, the primary current controller 43a is held activated until it gradually lowers the control current to the level of zero at step S112. On the other hand, if the answer to the decision is "NO," this indicates that the driver has no intention of re-starting the engine 2, and then, the supplemental current controller 43b is activated to supply a control current so as to hold the related EMC differential continuously locked for a specified period of time determined by the internal timer at step S113.

It is also to be understood that although the present invention has been described in detail with respect to a preferred embodiment thereof, various other embodiments and variants may occur to those skilled in the art. Such other embodiments and variants fall within the scope and spirit of the invention and are intended to be covered by the following claims.

What is claimed is:

1. A control system for restrictively controlling at least one differential of a vehicle, said at least one differential having a pair of differential driven shafts, said at least one differential driving both of said differential driven shafts but allowing said shafts to turn at different speeds when negotiating turns, said at least one differential being electromagnetically controlled to lock and unlock said differential driven shafts, said control system comprising:
   control mode selection means for manually selecting control modes in which said at least one differential is controlled in predetermined different patterns;
   driving condition detecting means for detecting a specific driving condition of the vehicle; and
   restrictive control means for (a) restrictively applying a locking current to said at least one differential to cause said at least one differential to lock said differential driven shafts in accordance with the control modes selected through said mode selection means, (b) gradually lowering and shutting off said locking current from said at least one differential so as to unlock said differential driven shafts when said driving condition detecting means detects said specific driving condition and (c) immediately lowering and shutting off said locking current from said at least one differential so as to unlock said differential driven shafts when said driving condition detecting means does not detect said specific driving condition.

2. A control system as defined in claim 1, wherein said at least one differential includes an electromagnetically controlled clutch disposed between said differential driven shafts for locking and unlocking said differential driven shafts and said restrictive control means applies the locking current to the clutch.

3. A control system as defined in claim 2, wherein said at least one differential comprises more than one differential gear.

4. A control system for restrictively controlling at least one differential of a vehicle, said at least one differential having a pair of differential driven shafts, said at least one differential driving both of said differential driven shafts but allowing said shafts to turn at different speeds when negotiating turns, said at least one differential being electromagnetically controlled to lock and unlock said differential driven shafts, said control system comprising:
   control mode selection means for manually selecting control modes in which said at least one differential is controlled in predetermined different patterns;
   driving condition detecting means for detecting a specific driving condition of the vehicle; and
   restrictive control means for (a) restrictively applying a locking current to said at least one differential to cause said differential driven shafts to lock in accordance with the control modes selected through said mode selection means and (b) gradually lowering and shutting off said locking current from said at least one differential so as to unlock said differential driven shafts when said driving condition detecting means detects said specific driving condition, wherein said at least one differential is disposed between said differential driven shafts for locking and unlocking said differential driven shafts, said restrictive control means applies the locking current to the clutch, and said at least one differential comprises a center differential having a first electromagnetically controlled clutch connected between front and rear propeller shafts that form said differential driven shafts, a front differential having a second electromagnetically controlled clutch connected between front axles that form said differential driven shafts, and a rear differential having a third electromagnetically controlled clutch connected between rear axles that form said differential driven shafts.

5. A control system as defined in claim 2, wherein said restrictive control means functions to sequentially unlock a plurality of differentials with time delays.

6. A control system as defined in claim 2, and further comprising torque detecting means for detecting cyclic torque of each differential driven shaft.

7. A control system for restrictively controlling vehicle differential means for driving a pair of differential driven shafts but allowing said shafts to turn at different speeds when negotiating turns, said vehicle differential means being electromagnetically controlled to lock and unlock said differential driven shafts and comprising a center differential which is connected between front and rear propeller shafts that form said differential driven shafts, and a rear differential, which is connected between rear axles that form said differential driven shafts, said control system comprising:
   control mode selection means for manually selecting control modes in which said differential means is controlled in predetermined different patterns;
   driving condition detecting means for detecting a specific driving condition of a vehicle; and
   restrictive control means for (a) restrictively applying a locking current to said vehicle differential means to cause at least one of said driven shafts to lock in accordance with said control modes selected by said control mode selection means and (b) gradually lowering and shutting off said locking current applied to said differential means so as to unlock said at least one of said driven shafts when said driving condition detecting means detects said specific driving condition.

8. A control system for restrictively controlling vehicle differential means for driving a pair of differential driven shafts but allowing said shafts to turn at different speeds when negotiating turns, said vehicle differential means being electromagnetically controlled to lock and unlock said differential driven shafts and comprising a center difffential which is connected between front and rear propeller shafts that form said differential driven shafts, and a front differential, which is connected between front axles that form said differential driven shafts, said control system comprising:
   control mode selection means for manually selecting control modes in which said differential means is controlled in predetermined different patterns;

driving condition detecting means for detecting a specific driving condition of a vehicle; and restrictive control means for (a) restrictively applying a locking current to said vehicle differential means to cause at least one of said driven shafts to lock in accordance with said control modes selected by said control mode selection means and (b) gradually lowering and shutting off said locking current applied to said differential means so as to unlock said at least one of said driven shafts when said driving condition detecting means detects said specific driving condition.

9. A control system as defined in claim 1, wherein said driving condition detecting means detects engine stopping as said specific driving condition.

10. A control system as defined in claim 1, wherein said driving condition detecting means detects vehicle stopping as said specific driving condition.

11. A control system as defined in claim 10, wherein said driving condition detecting means further detects that a self starter is not turned on as said specific driving condition.

12. A control system as defined in claim 7, and further comprising torque detecting means for detecting cyclic torque and wherein said driving condition detecting means detects that cyclic torque detected by said torque detecting means does not exceed a predetermined amount as said specific driving condition.

13. A control system as defined in claim 8, and further comprising torque detecting means for detecting cyclic torque and wherein said driving condition detecting means detects that cyclic torque detected by said torque detecting means does not exceed a predetermined amount as said specific driving condition.

* * * * *